United States Patent [19]

Savard

[11] Patent Number: 4,885,044
[45] Date of Patent: Dec. 5, 1989

[54] METHOD OF CONTROLLING HARDNESS OF PIPE WELD-JOINTS BY RADIALLY INSERTING INSULATING RINGS PRIOR TO TEMPERING HEAT-TREATMENT

[75] Inventor: Donald D. Savard, Edmonton, Canada

[73] Assignee: Interprovincial Pipe Line Company, Edmonton, Canada

[21] Appl. No.: 207,031

[22] Filed: Jun. 15, 1988

Related U.S. Application Data

[60] Continuation-in-part of Ser. No. 98,864, Sep. 21, 1987, abandoned, which is a continuation of Ser. No. 913,681, Nov. 13, 1986, abandoned, which is a division of Ser. No. 837,779, Mar. 10, 1986, Pat. No. 4,634,040.

[51] Int. Cl.$^4$ .......................... C21D 9/08; C21D 9/50
[52] U.S. Cl. .................... 148/127; 148/143; 228/119; 228/138
[58] Field of Search ............... 148/143, 127; 228/138, 228/119

[56] References Cited

U.S. PATENT DOCUMENTS

| | | | |
|---|---|---|---|
| 2,173,109 | 9/1939 | Hamblin | 228/216 |
| 2,188,925 | 2/1940 | Ronay | 228/216 |
| 2,320,700 | 6/1943 | Kent et al. | 228/216 |
| 2,331,689 | 10/1943 | Hodge | 228/216 |
| 2,847,958 | 8/1958 | Norton et al. | 228/216 |
| 3,110,103 | 11/1963 | Davey | 228/216 |
| 3,992,231 | 11/1976 | Timmons | 148/143 |
| 4,001,054 | 1/1977 | Makepeace | 148/16.5 |
| 4,229,235 | 10/1980 | Matsuda et al. | 148/127 |
| 4,354,883 | 10/1982 | Terasaki | 148/127 |
| 4,415,114 | 11/1983 | Hallenbeck | 228/219 |
| 4,634,040 | 1/1987 | Savard | 228/119 |
| 4,731,131 | 3/1988 | Sakata et al. | 148/127 |

*Primary Examiner*—Upendra Roy
*Attorney, Agent, or Firm*—Ernest Peter Johnson

[57] ABSTRACT

A process is provided for heat treating an annular martensitic heat-affected zone. The heat-affected zone is commonly created in the outer segment of a pipeline wall as a result of applying a circumferential fillet weld to the pipe. The embrittled zone creates a weakness in the pipe wall and it is therefore desirable to heat treat it. The heat-treating process is carried out in connection with a situation where the pipeline has an open end located close to the weld and a plug has been inserted in the bore of the line to isolate the main part of the line from the pipe end having the weld. An expandable and contractable insulating ring is inserted into the pipe bore. The ring is associated with a closure member which blanks and seals the open end of the pipe. The isolating plug is removed and the ring is positioned beneath the weld and expanded to abut the pipe wall. A final circumferential weld or bead is then applied to the existing weld, which causes heating of the martensitic zone. The insulating ring is maintained in place against the pipe wall to ensure that the heated zone cools only slowly. This results in reduction of the hardness of the heat-affected zone. The isolating plug is then re-inserted and the insulating ring and closure member are removed.

3 Claims, 6 Drawing Sheets

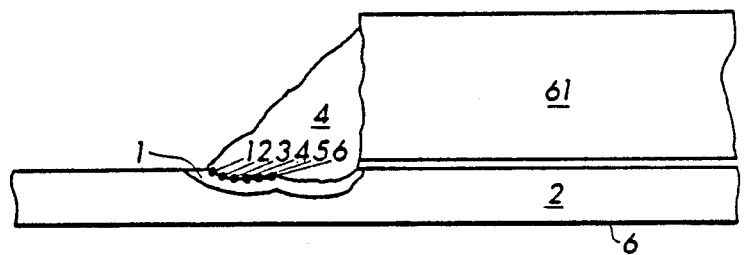
_Fig. 12._
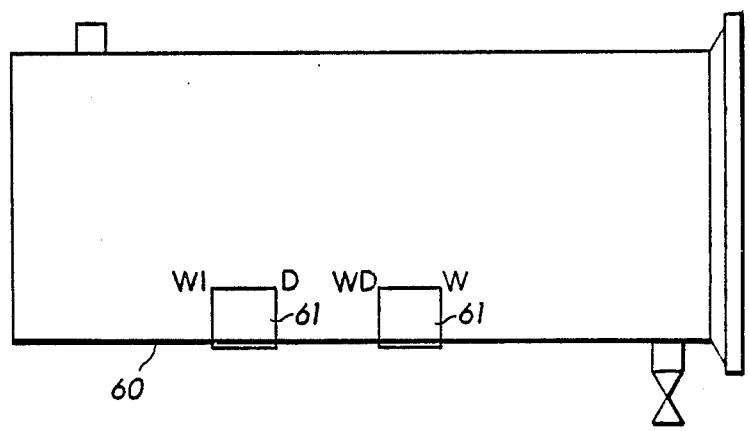
_Fig. 13._

METHOD OF CONTROLLING HARDNESS OF PIPE WELD-JOINTS BY RADIALLY INSERTING INSULATING RINGS PRIOR TO TEMPERING HEAT-TREATMENT

CROSS-REFERENCES

This application is a continuation-in-part of Ser. No. 07/098,864 filed Sept. 21, 1987, which is a continuation of Ser. No. 06/913,681 filed Nov. 13, 1986, now abandoned, which is a divisional of Ser. No. 06/837,779 filed Mar. 10, 1986, now issued as Pat. No. 4,634,040.

FIELD OF THE INVENTION

The present invention relates to an improvement in the process of applying a circumferential fillet weld to a pipeline filled with liquid. More particularly, it relates to temporarily internally insulating the pipe wall beneath the weld line during welding, to thereby reduce the rate of heat transfer from the pipe wall heat-affected zone to the liquid in the pipe. As a result, embrittlement of the pipe wall beneath and adjacent to the weld is reduced, relative to what it would have been in the absence of the presence of the insulation during welding.

PRIOR ART

The present invention was developed in connection with problems arising from the installation and use of stopple tees on a high pressure steel fluid transmission pipeline. For purposes of background, this specific application will now be discussed. However, the invention is useful in other pipeline welding applications and it is not to be limited to the particular context of situations involving stopple assemblies.

Stopple equipment is commonly used in connection with internally plugging the pipe bore to temporarily isolate a section of the pipeline. Typically, two such assemblies might be positioned in spaced apart relationship on a pipeline, to bracket a section of pipe which is to be modified or removed. The assemblies can be actuated to block the fluid flow and isolate the section. The pipe section may then be drained and severed at its ends, to permit of the insertion of a replacement section.

A typical stopple plugging assembly is illustrated in FIG. 1. It comprises a T-shaped sleeve which comes in split halves. The sleeve halves are emplaced on the pipe and welded together longitudinally. Circumferential fillet welds are then applied at each end between the sleeve and the pipe. The sleeve thus becomes a pressure vessel, mounted about the pipe. A sandwich valve may then be mounted on the flange of the sleeve, as shown. A tapping assembly, comprising a vertically movable cutter contained in a housing, is attached to the valve. The cutter is applied through the valve to create an opening in the pipe wall. The tapping assembly is then removed and replaced by a housing containing a plugging head. A vertical cylinder is connected to the plugging head and actuated to extend it through the tapped opening into the pipe bore. The plugging head, carrying a circumferential sealing ring, is adapted to pivot slightly from an angled state to a more vertical state and to wedge tightly against the internal surface of the pipe, to close and seal the pipe bore. After the pipeline has been closed off in this manner at each end of the section to be removed, then the severing and substitution steps can be carried out. After the new pipe section has been installed, the stopple plugging heads are retracted, the upper part of the assembly including the sandwich valve is removed, and the stopple sleeves, equipped with a disk plug and blind flange, are left in place as an integral part of the line.

Now, there can be a problem associated with the annular heat-affected zones underlying the toes of the circumferential fillet welds used to close in the ends of the stopple sleeve. More particularly, to satisfactorily complete the weld it is necessary to heat the pipe wall to welding temperature. The presence of liquid in the line accelerates the cooling rate of the weld and the underlying heat-affected zone of the pipe wall. When this cooling rate is too rapid, the pipe steel will form brittle martensitic microstructures underlying and adjacent to the toe of the circumferential weld. This is undesirable as the pipe may then be liable to fail along the toe of the weld. This can occur when the line is subjected to stress, as might occur when there is shifting during freeze/thaw cycles of the surrounding soil.

There exists, therefore, a need to address the problem of the deleterious cooling effect of the liquid upon the fillet weld process.

SUMMARY OF THE INVENTION

In general, the invention involves a process comprising:
  inserting into the line bore through an open end of the pipeline a radially expandable and contractable insulating ring and positioning the ring at a locus underlying a circumferential fillet weld which has previously been applied to the outer surface of the line;
  expanding the ring so that it abuts the inner surface of the pipe wall;
  heat treating the pipe wall underlying the weld with the expanded ring in contiguous insulating relation to the pipe wall and maintaining the ring in contact with the pipe wall so that the zone only slowly cools; and then
  contracting and removing the ring and associated equipment from the line, to leave it clear for use.

By separating the liquid, which constitutes a heat sink, from the weld area by emplacing the insulating ring against the inner surface of the pipe, the rate of cooling in the heat-affected zone is reduced, with a corresponding reduction in the hardness of the embrittled zone.

The heat treating step may be accomplished by applying a final circumferential bead to the fillet weld.

In a preferred version of the invention, the following steps are also incorporated into the process:
  The line is first isolated on one side of the weld and severed on the other side to create a short segment of open ended pipe extending from the weld; and
  The ring is inserted through the open end of the segment as part of a first assembly which is secured to the pipe end. More particularly, the first assembly comprises a closure member for blanking and sealing the pipe open end, the ring, and means, extending through the closure member, for supporting, positioning and expanding and contracting the ring.

In a more preferred form of the invention, the heat-affected zone to be heat treated is associated with a circumferential fillet weld connected with an end of a stopple sleeve mounted on the line. The line is first isolated by setting a plugging head in the pipe bore. The line is then severed and a flange is applied to the open-ended segment of the line. The first assembly is secured to the flange to effectively close the open end. The stopple plugging head may then be withdrawn, to leave the pipe bore open, so that the insulating ring can be moved axially and positioned below the two spaced apart fillet welds which are located at the ends of the sleeve. When the heat treatment has been completed with the ring in insulating abutting relation, the ring is contracted and retracted into the open-ended pipe segment. The stopple plugging head may then again be re-set to plug the pipe bore. And then the first assembly may be removed.

This last described form of the process may be carried out in conjunction with each of two stopple sleeves mounted to bracket a section of pipe to be removed. When the two stopple plugging heads have been re-inserted and set to isolate the two open-ended segments, a section of new pipe may be inserted between the two segments and welded in place.

Broadly stated, the invention is a method for reducing the hardness of a heat-affected zone of the pipe wall in a pipeline filled with liquid, said zone being contiguous to the toe of a circumferential fillet weld formed on the pipe, comprising: inserting a radially expandable and contractable insulating ring within the pipeline; positioning the ring beneath the fillet weld and radially expanding the ring to abut the inner surface of the pipe wall; heat treating the heat-affected zone with the ring in contiguous relation to the pipe wall; cooling the zone while maintaining the ring in insulating contact with the inside surface of the pipe wall; and contracting the ring and removing it from the pipeline.

DESCRIPTION OF THE DRAWINGS

FIG. 12 is a fanciful representation showing in section a sleeve, pipe wall, and fillet weld; and FIG. 13 is a side view of a test vessel in connection with which the process was tested.

DESCRIPTION OF THE PREFERRED EMBODIMENT

Figure 1:
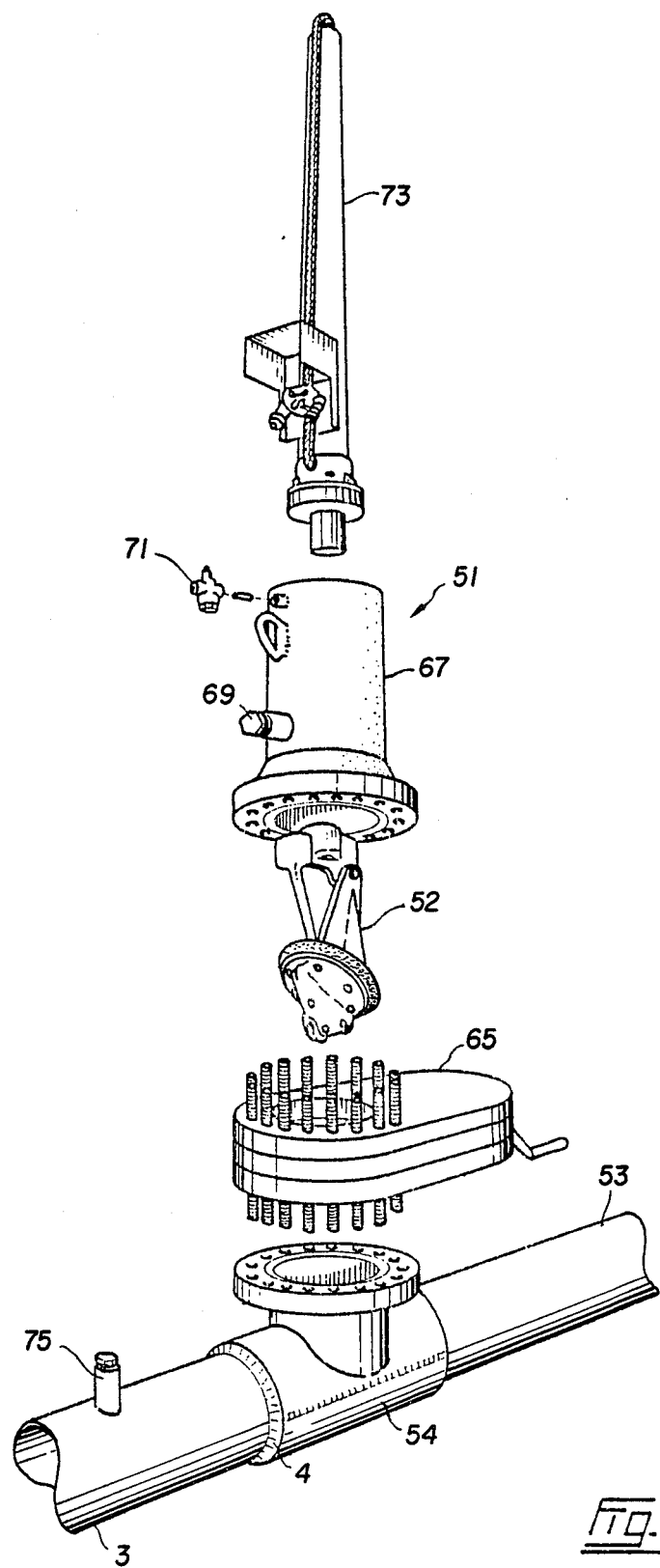
FIG. 1 is a perspective exploded view of a typical prior art stopple assembly.

The present invention has to do with treating the heat-affected zone 1 created in the wall 2 of a liquid-filled pipeline 3 by applying a circumferential fillet weld 4 to it. The treatment involves heating the zone 1 and then retarding the cooling rate of the zone by maintaining an insulating ring 5 in abutting contact with the inside surface 6 of the pipeline wall 2 in the weld area during cooling. In this way, the hardness of the heat-affected zone 1 may be reduced relative to what it would have been if heated with the insulation absent.

In the practice of the invention, the insulating ring 5 must be brought into the bore 7 of the pipeline 3. To achieve this, the pipeline 3 must be open-ended close to the weld 4 whose heat-affected zone 1 is to be treated. This typically would be accomplished by plugging the pipeline 3 at points spaced on each side of the severing plane and cutting the pipeline 3 between the plugs.

In connection with so emplacing the insulating ring 5, there is provided a first assembly 8, of which the ring forms a part. This first assembly 8 is adapted:
to blank and seal the pipe opening 9;
to position the insulating ring 5 beneath the weld 4 whose heat-affected zone 1 is to be treated;
to expand the insulating ring 5, so as to bring it into abutting relation relationship with the pipe's inside surface 6; and
to contract the insulating ring 5 for removal.

A flange 10 is mounted on the outside surface of the now open-ended pipeline 3. The first assembly 8 comprises a closure plate 11 having a peripheral flange 12 which may be bolted to the pipe flange 10. The closure plate 11 functions to seal and close the pipe opening 9.

The closure plate 11 has a central opening 13 into which is welded a tubular fitting 14. The fitting 14 forms a bore 15 through which extends an outer shaft 29, forming part of the first assembly 8. A tubular packing gland 16 is positioned within the fitting 14, for sealing around the outer shaft 29. A sleeve 17 having a flange 18 is mounted around the outer shaft 29. A nut 19 is screw-threaded onto the outer end of the fitting 14 and acts against the flange 18 to press the sleeve 17 inwardly to expand the packing gland 16 into tight sealing engagement with the outer shaft 29. A segmented bolted clamp 20 is secured to the outer end of the sleeve 17 and may be tightened to friction grip the outer shaft 29 for a purpose described below. From the foregoing, it will be understood that the outer shaft 29 extends through the closure plate 11 in sealing engagement therewith.

The first assembly 8 further comprises a tubular support shaft 21, which extends along the axis of the pipeline 3 through the fitting 14 when the assembly 8 is mounted on the end of the pipeline 3. A hydraulic cylinder 23 is mounted to the outer end of the first assembly 8. The shaft 24 of the cylinder 23 is connected to the support shaft 21, for reciprocating the latter axially.

At its inner end, the support shaft 21 carries a first annular member 25. The member 25 has a conical surface 26 whose narrow end is directed toward the closure plate 11. The first annular member 25 is fixed to the support shaft 21 by a cap 27 which extends over the end of the shaft and screws into the member 25. Thus the support shaft 21 and the first annular member 25 form a solid unit and move as one.

The support shaft 21 also carries a second annular member 28, which is positioned close to the closure plate 11. The member 28 has a conical surface 28a, whose narrow end is directed away from the closure plate 11.

The tubular outer shaft 29 is concentrically and slidably mounted on the support shaft 21 and extends through the fitting 14. The inner end of the outer shaft 29 is screwed into the second annular member 28. Thus the outer shaft 29 and second annular member 28 form a solid unit that moves as one.

A linked pair of annular members 30, 31 are mounted on the support shaft 21 and can slide therealong. The annular member 30 is adjacent to the annular member 25 and has a conical surface 32 whose narrow end is directed away from the closure plate 11. The member 31 is adjacent to the member 28 and has a conical surface 33 whose narrow end is directed toward the closure plate 11. A tubular spacer 34 is concentrically and slidably mounted on the support shaft 21 between the annular members 30, 31. The spacer 34 is threadably connected with the annular members 30, 31 so that the three components form a solid unit and move as one.

An elastomer ring member 35, having a V-shaped bottom surface 36, is supported by the conical surfaces 26, 32 of the annular members 25, 30. Similarly, an elastomer ring member 37, having a V-shaped bottom surface 38, is supported by the conical surfaces 28a, 33 of the annular members 28, 31. Each elastomer ring member 35, 37 has a wide groove 39 formed in its upper surface. An insulating layer 40 of closed cell foam rubber is disposed in each such groove 39. The combination of the elastomer ring member and the insulating layer together make up the "insulating ring 5" previously mentioned.

It will be understood that while the embodiment shown and described involves two short rings 5, for insulating two spaced apart welds at the ends of a sleeve, one could alternatively use a single long ring for the same purpose and modify the assembly to accommodate this change.

In addition, in the embodiment shown, the spacing between the elastomer ring members 35, 37 is governed by the length of the spacer 34.

A winch assembly 41 is provided for biasing the inner and outer shafts 21, 29 together into the pipeline bore 7 to position them beneath the welds to be treated. More particularly, an end bracket 42, carrying pulleys 43, is secured to the outer end of the cylinder 23. A cable 44, carrying a winch 45, may be attached to the ears 46 of the clamp 20 and extend around the pulleys 43. The winch 45 may be actuated to bias the shafts 21, 29 into the bore 7.

Figure 11:
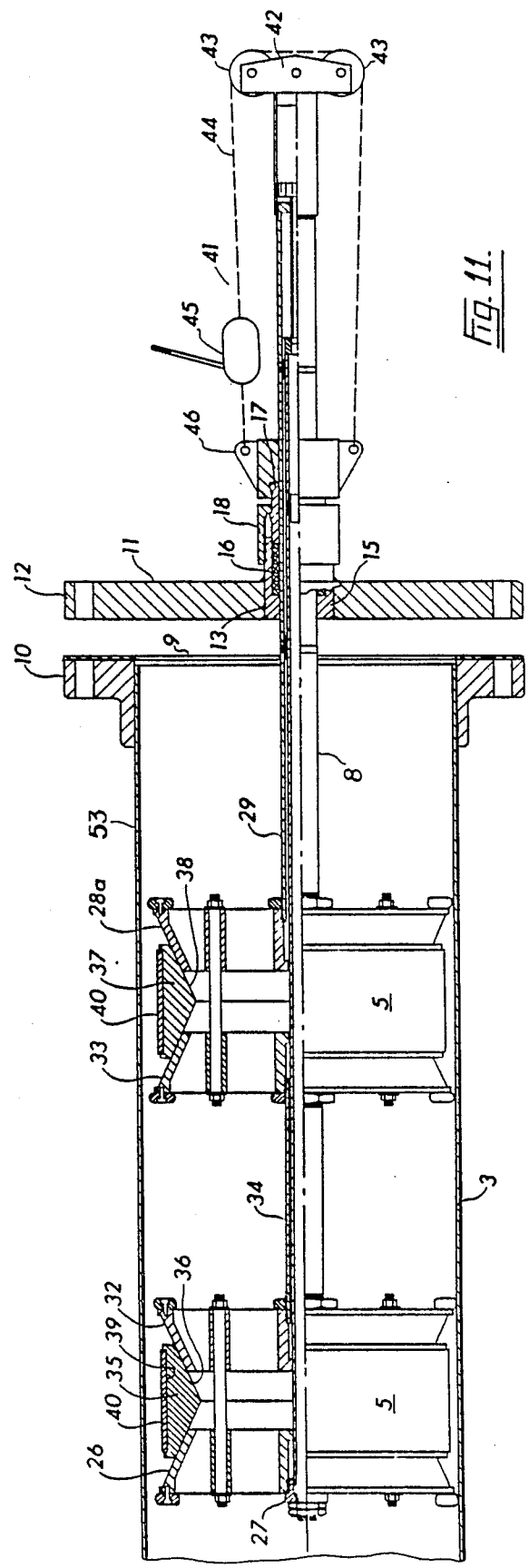

In use, the first assembly 8 is inserted into the pipeline bore 7 through the pipe opening 9. The closure plate flange 12 is bolted to the pipe flange 10. During this operation, the cylinder 23 is in the extended state and the rings 5 are contracted, as illustrated in FIG. 11. The winch assembly 41 is actuated to bias the shafts 21, 29 inwardly to locate the rings 5 beneath the welds. The clamp 20 is then tightened, to fix the outer shaft 29 and the annular member 28 which is attached to it. At this stage, the inner shaft 21 may still be moved longitudinally by the cylinder 23, but the outer shaft 29 and annular member 28 are fixed. The cylinder 23 may now be contracted, which advances the annular member 25 to the right (in the Figures) thereby biasing the annular members 30, 31 and spacer 34 toward the right and crowding them together against the fixed annular member 28. When this happens, the conical surfaces 26, 28a, 32, 33 cooperate to stretch the insulating rings 5 outwardly and radially to bring them into abutment with the inner surface 6 of the pipeline 3. When the cylinder 23 is again expanded, the stretched insulating rings 5 contract and force the annular members to the spread apart position. The extent of contraction by the elastomer ring members 35, 37 and spreading apart of the pairs of annular members 25, 30 and 28, 31 is limited by the bolts 47 extending through said pairs.

Figure 2:
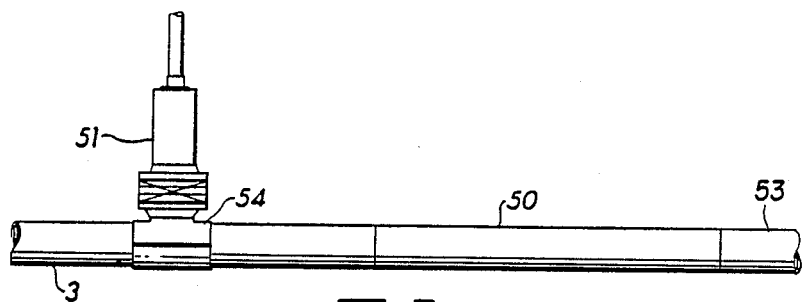
FIGS. 2-9 is a series of schematic partly sectional side views illustrating the steps practiced in heat treating the circumferential fillet welds of a stopple sleeve in conjunction with removing a section of pipe from a pipeline.
Figure 3:
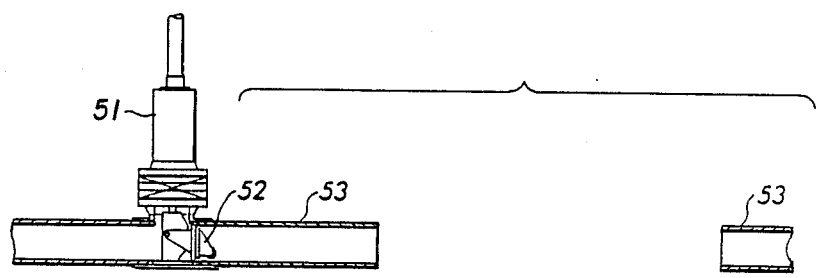
Figure 4:
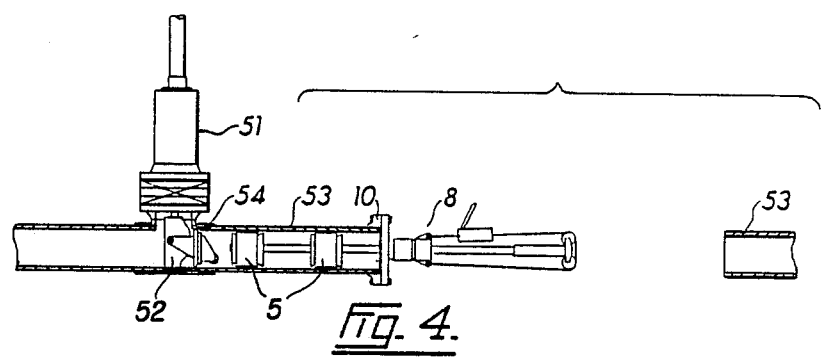
Figure 5:
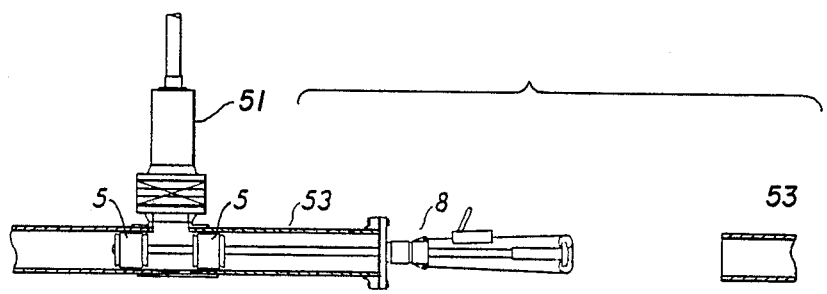
Figure 6:
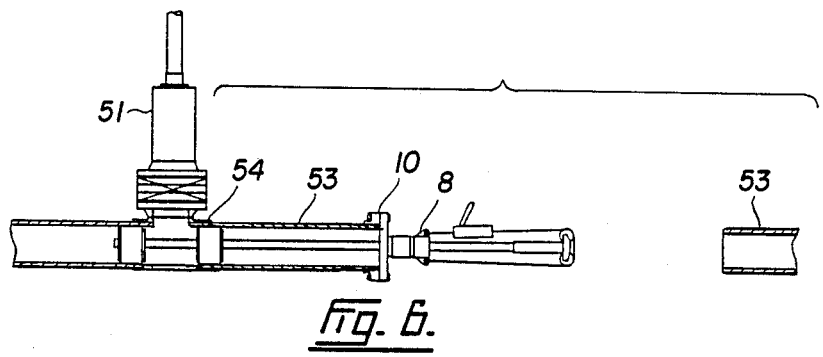
Figure 7:
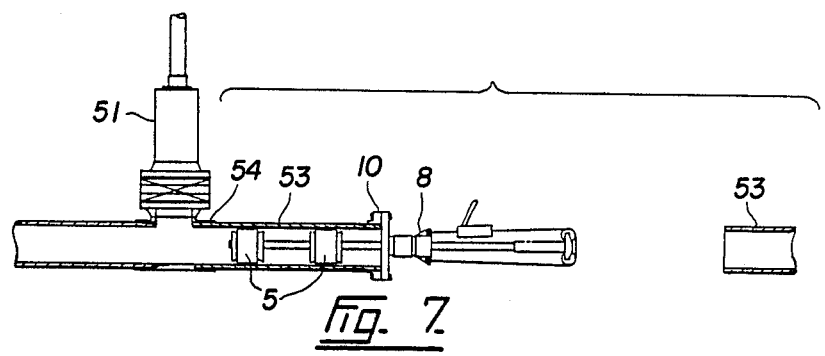
Figure 8:
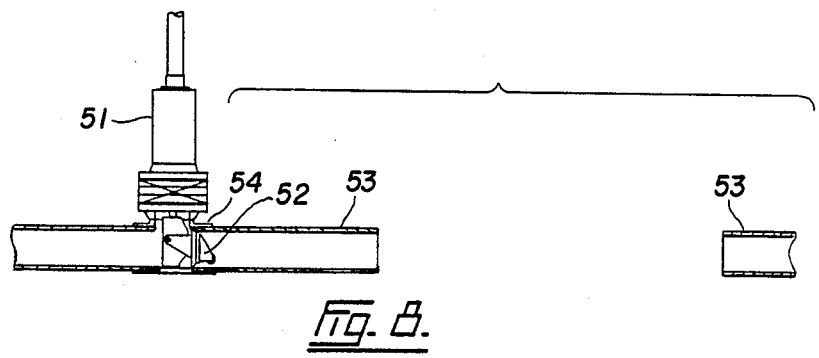
Figure 9:
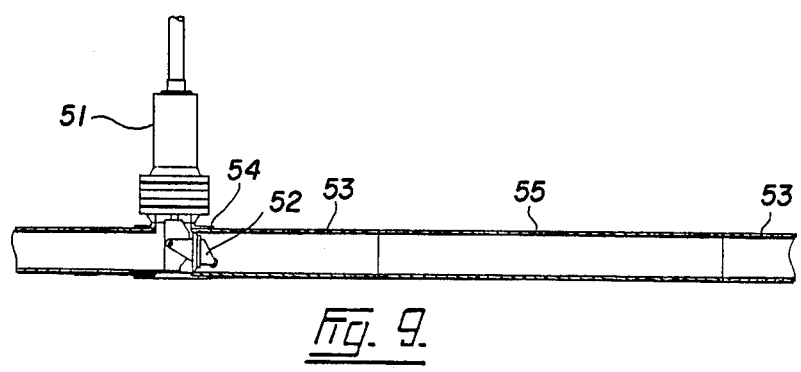
Figure 10:
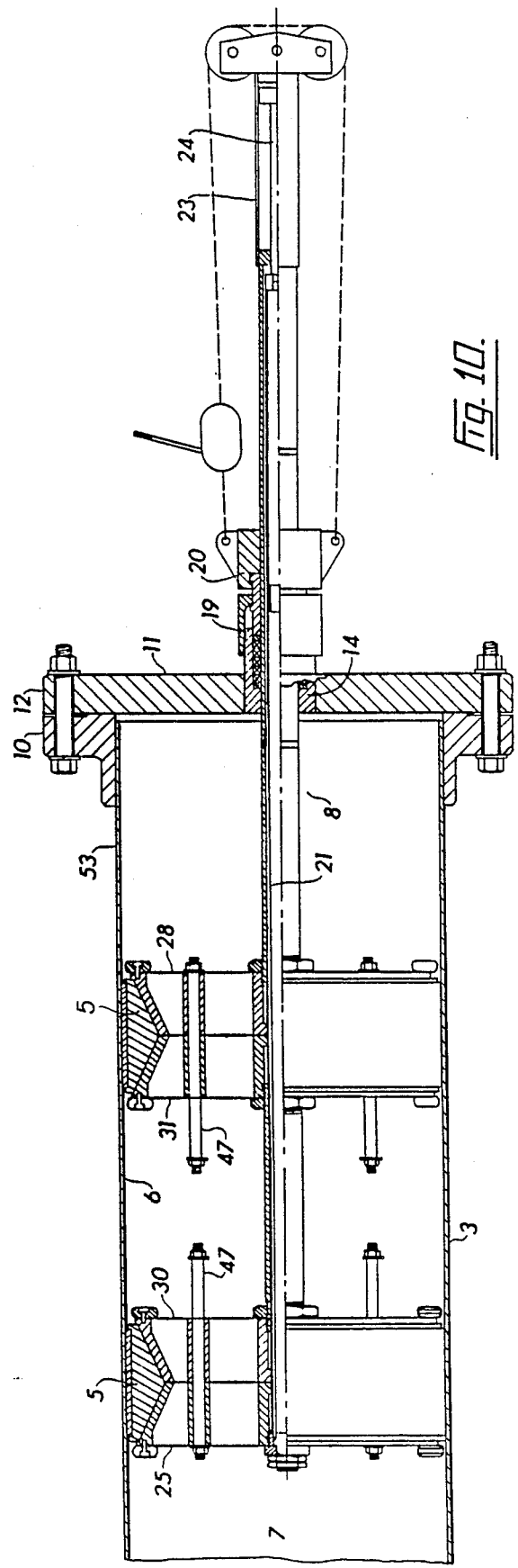
FIGS. 10 and 11 are partly sectional side views showing the first assembly in the expanded and contracted modes respectively.

Having reference now to FIGS. 2-9, the invention will be described in connection with the removal of a section 50 of pipeline 3. FIG. 1 shows a prior art stopple plugging device 51 mounted on the line 3 which has an equalization connection 75. The device 51 includes stopple sleeve 54 onto which is mounted sandwich valve 65, a housing 67 having an equalization connection 69, and a bleeder valve 71. A hydraulic cylinder 73 is received in housing 67 to actuate plugging head 52. FIGS. 2-9 show the sequence of steps employed and apparatus used in carrying out the present invention. As shown in FIG. 2, the stopple equipment is installed in the section of pipeline to be removed. Each device 51 is positioned at a point spaced from one end of the section 50, so that they bracket the latter. FIG. 3 illustrates plugging the pipeline with stopple device 51 and the subsequent removal of section 50 of the pipeline. In the practice of the invention, two devices 51 are operated to extend plugging heads 52 into the pipe bore 7 to isolate the section 50. The line 3 is then drained between the plugging heads 52. The pipeline is then severed at each end of section 50 and the section is removed, leaving an open-ended segment 53 of pipe extending from each device 51. FIG. 4 illustrates the manner in which a first assembly 8 having insulating rings 5 is inserted through a weld-mounted flange 10 into the gas-free pipeline 53. A flange 10 is first secured to the end of the pipe segment 53 and the first assembly 8 is mounted thereto. FIG. 5 illustrates the position of the insulating rings 5 in pipeline 53 after retraction of plugging heads 52. The plugging heads 52 are retracted and the insulating rings 5 positioned beneath the circumferential fillet welds 4 of the stopple sleeves 54. The first assembly 8 is then actuated to expand the insulating rings 5 into abutting relation with the inside surface 6 of the pipeline 3 beneath the welds 4 as shown in FIG. 6. One or more circumferential welds or beads are then applied to the existing welds with the rings 5 providing insulation. After the heated-affected zones 1 in the pipe wall 2 have cooled with the rings 5 in insulating relation therewith, each first assembly 8 is actuated to contract the rings 5 and retract them toward the closure plate 11 as shown in FIG. 7. As shown in FIG. 8, the plugging heads 52 are then re-set to isolate the pipe end segments 53. The first assemblies 8 are removed. The replacement pipe section 55 is then inserted between the pipe end segments 53 and welded into place. And finally, the plugging heads 52 are retracted to clear the bore 7.

EXAMPLE

The inventive process is directed toward heat treating the heat-affected zone 1 of the pipe wall 2, which zone 1 is contiguous to the toe of the weld 4. The mechanism involved is to heat the zone 1 by applying a second circumferential weld and then retarding cooling of the zone 1 by insulating the pipe wall beneath the zone 1 at its inner surface. This leads to reduction of the hardness and increase of the ductility of the zone relative to its condition in the absence of such an insulating device. This result is substantiated by the following.

PROCEDURE

The test vessel 60 (shown in FIG. 13) was constructed specifically for this test. The pipe used was a section of 508 mm Line 1 pipe. A chemical analysis completed on the pipe demonstrated it had a carbon equivalent of 0.478 with a carbon content of 0.265. The results of the chemical analysis are provided in Table I.

TABLE I
Chemical Analysis of Test Vessel Pipe

| Sample No. | C | Mn | Si | Total of Residuals Based on CSA CE Formula | CE |
|---|---|---|---|---|---|
| ML-1 | 0.265 | 1.12 | 0.038 | 0.025 | 0.478 |

Note:
CE based on CSA Z245.1 formula
$$CE = C + \frac{Mn}{6} + \frac{Si}{24} + 0.025,$$
where the last number is the average of elements contributing to the CE, based on previous chemical analysis checks. Little variance was noted in the previous checks and those elements had a small effect on the CE value.

Partial sleeves 61 of A516 Gr. 70 material were tack welded to this vessel and the following test fillet welds were completed:

Three UF-28/S type fillet welds were completed on the test vessel with it filled with water. The water was circulated through the vessel at the time of welding. Each of these were designated wet condition type welds.

One UF-28/S type fillet weld was completed on the empty vessel. This was designated D-1 to represent a dry condition type weld.

With the vessel still empty a single pass using a 2.4 mm 48018 electrode was placed over the toe of one of the UF-28/S welds completed under wet conditions. This pass is considered a tempering pass. The weld itself was designated WD-1 to represent a weld completed under both wet and dry conditions.

With the vessel filled with water and the first assembly 8 installed, a single pass using a 2.4 mm 48018 electrode was placed over the toe of another UF-28/S weld completed under wet conditions. This single pass was completed while simulating actual field welding conditions. Again this pass is considered a tempering pass. It was designated WI-1 to represent a weld completed under wet conditions using the insulator.

The remaining UF-28/S weld completed under wet conditions was designated W-1.

The layout of the test fillet welds is shown in FIG. 4. Each weld total length was approximately 254 mm.

Upon completion of the welding, sections containing approximately 150 mm of fillet weld were removed from each of the test welds. These sections were then sent to the Welding Institute of Canada (WIC) to have hardness measurements taken at the toe of the fillet welds.

The WIC removed a cross-section from the middle of each test weld section and prepared it for Vickers hardness measurements. The Vickers hardness measurements were taken along the fusion line at the toe of each test fillet weld using a 5 Kg load, as set forth in FIG. 12.

The results of WIC hardness measurements are shown in Table II.

TABLE II
WIC Hardness Measurement Results

| | Location | | | | | |
|---|---|---|---|---|---|---|
| Sample # | 1 | 2 | 3 | 4 | 5 | 6 |
| D-1 | 223 | 206 | 204 | 206 | 201 | 190 |
| WI-1 | 229 | 218 | 221 | 208 | 216 | 201 |
| W-1 | 321 | 310 | 289 | 289 | 317 | 341 |
| WD-1 | 229 | 216 | 218 | 225 | 221 | 218 |

The results of the hardness measurements completed by the WIC show that hardness at the toe of the weld is reduced when the internal insulator is used. From Table II it can be seen that the weld WI-1 made in conjunction with use of the internal insulator is approximately 100 $Hv_5$ hardness points less than the weld W-1 done under wet conditions without the insulation.

The embodiments of the invention in which an exclusive property or privilege is claimed are defined as follows:

1. A method for reducing the hardness of a heat-affected zone of the pipe wall in a pipeline filled with liquid, said zone being contiguous to the toe of a circumferential fillet weld formed on the pipe, comprising:
   inserting a radially expandable and contractable insulating ring within the pipeline;
   positioning the ring beneath the fillet weld and radially expanding the ring to abut the inner surface of the pipe wall;
   heat treating the heat-affected zone with the ring in contiguous relation to the pipe wall;
   cooling the zone while maintaining the ring in insulating contact with the inside surface of the pipe wall; and
   contracting the ring and removing it from the pipeline.

2. A method for reducing the hardness of a heat-affected zone of the pipe wall in a pipeline filled with liquid, said zone being contiguous to the toe of a circumferential fillet weld formed on the pipe close to an open end of the pipeline, the main portion of said pipeline having been isolated from the weld area, comprising:
   securing to the pipeline's open end a first assembly comprising a first means for blanking and sealing the open end of the pipeline, a radially expandable and contractable insulating ring positioned within the pipeline, and means, extending through the first means, for supporting, positioning and expanding and contracting the ring;
   positioning the ring beneath the fillet weld and radially expanding the ring to abut the inner surface of the pipe wall;
   heat treating the heat-affected zone with the ring in contiguous relation to the pipe wall;
   cooling the zone while maintaining the ring in insulating contact with the pipe wall; and
   contracting the ring and removing the first assembly from the pipeline.

3. A method for reducing the hardness of a heat-affected zone of the pipe wall in a pipeline filled with liquid, said zone being contiguous to the toe of a circumferential fillet weld, said weld having been formed on the pipe in association with the installation of a stopple sleeve, comprising:
   plugging the pipeline bore by insertion of a plugging head through the stopple sleeve;
   severing the line downstream from the plugging head to create an open-ended pipe segment;
   attaching a flange to the open end of the pipe segment;
   securing to the flange a first assembly comprising first means for blanking and sealing the open end of the pipe segment, a radially expandable and contractable insulating ring positioned within the pipe segment, and means extending through the first means for supporting, positioning and expanding and contracting the ring;

unplugging the pipeline bore by removing the plugging head;

positioning the ring beneath the fillet weld and radially expanding the ring to abut the inner surface of the pipe wall;

applying a circumferential weld to the existing fillet weld with the ring in contiguous relation to the pipe wall;

cooling the heat-affected zone while maintaining the ring in insulating contact with the pipe wall;

contracting the ring and retracting it into the pipe segment;

plugging the pipeline bore by insertion of a plugging head through the stopple sleeve; and removing the first assembly from the pipe end.

* * * * *